United States Patent [19]

Majkrzak

[11] Patent Number: 4,936,082
[45] Date of Patent: Jun. 26, 1990

[54] MECHANICAL AIR REEL

[75] Inventor: David S. Majkrzak, West Fargo, N. Dak.

[73] Assignee: Crary Company, Fargo, N. Dak.

[21] Appl. No.: 272,547

[22] Filed: Nov. 17, 1988

[51] Int. Cl.⁵ .............................................. A01P 57/02
[52] U.S. Cl. ........................................ 56/220; 56/227
[58] Field of Search ................................ 56/219–227, 56/12.8, 12.9, 13.2, 13.3, DIG. 8, DIG. 20, 400.21, 400, 14.4, 14.3

[56] References Cited

U.S. PATENT DOCUMENTS

| | | | |
|---|---|---|---|
| Re. 32,679 | 5/1988 | Brooks | 56/12.9 |
| 1,926,538 | 9/1933 | Hume et al. | 56/226 |
| 2,071,627 | 2/1937 | Hawn | 56/221 |
| 2,252,180 | 8/1941 | Hume | 56/219 |
| 2,497,729 | 2/1950 | Heth et al. | 56/226 |
| 2,644,289 | 7/1953 | Hume | 56/226 |
| 2,690,638 | 10/1954 | Finne | 56/220 |
| 2,734,331 | 2/1956 | Phillips | 56/296 |
| 3,145,520 | 8/1964 | Hume et al. | 56/226 X |
| 3,468,109 | 9/1969 | Reimer | 56/220 |
| 3,698,166 | 10/1972 | Fisher | 56/220 |
| 3,703,060 | 11/1972 | Gradwohl et al. | 56/226 |
| 3,964,245 | 6/1976 | Hecht | 56/331 |
| 4,038,810 | 8/1977 | Williams et al. | 56/220 |
| 4,067,177 | 1/1978 | Tout | 56/226 |
| 4,069,650 | 1/1978 | Montanari et al. | 56/221 |
| 4,303,373 | 12/1981 | Polhemus | 56/12.8 X |
| 4,776,155 | 10/1988 | Fox et al. | 56/220 |
| 4,825,628 | 5/1989 | Brooks | 56/219 |

Primary Examiner—Jerome W. Massie, IV
Assistant Examiner—Matthew Smith
Attorney, Agent, or Firm—Kinney & Lange

[57] ABSTRACT

A combined mechanical air reel for harvesting equipment has a control support-manifold tube and a plurality of depending tubes mounted on the support-manifold tubes that direct a curtain of air against grain to be cut to move the grain toward a cutter bar on which the reel is mounted. At the same time a rotatable finger carrying bat type mechanical reel, also mounted on the central support-manifold tube, is used to feed material to the cutter bar. The mechanical reel bats rotate around the outside of the support-manifold tube. The bats extend parallel to the cutter bar, and the postion of fingers on the bats is controlled by a cam action that permits the bats and the fingers to enter and exit the grain substantially vertically to reduce shattering of the grain. A positive cam drive is provided for actuating the fingers. Because an air assist is used for feeding, the rotating mechanical portion of the reel can be rotated slower than conventional reels and positioned higher in the crop to reduce shattering and wrapping, and to also improve visibility of the cutter bar. The air flow from the depending tubes improves feeding, and saves and keeps the cutter bar clean of shelled crop.

19 Claims, 7 Drawing Sheets

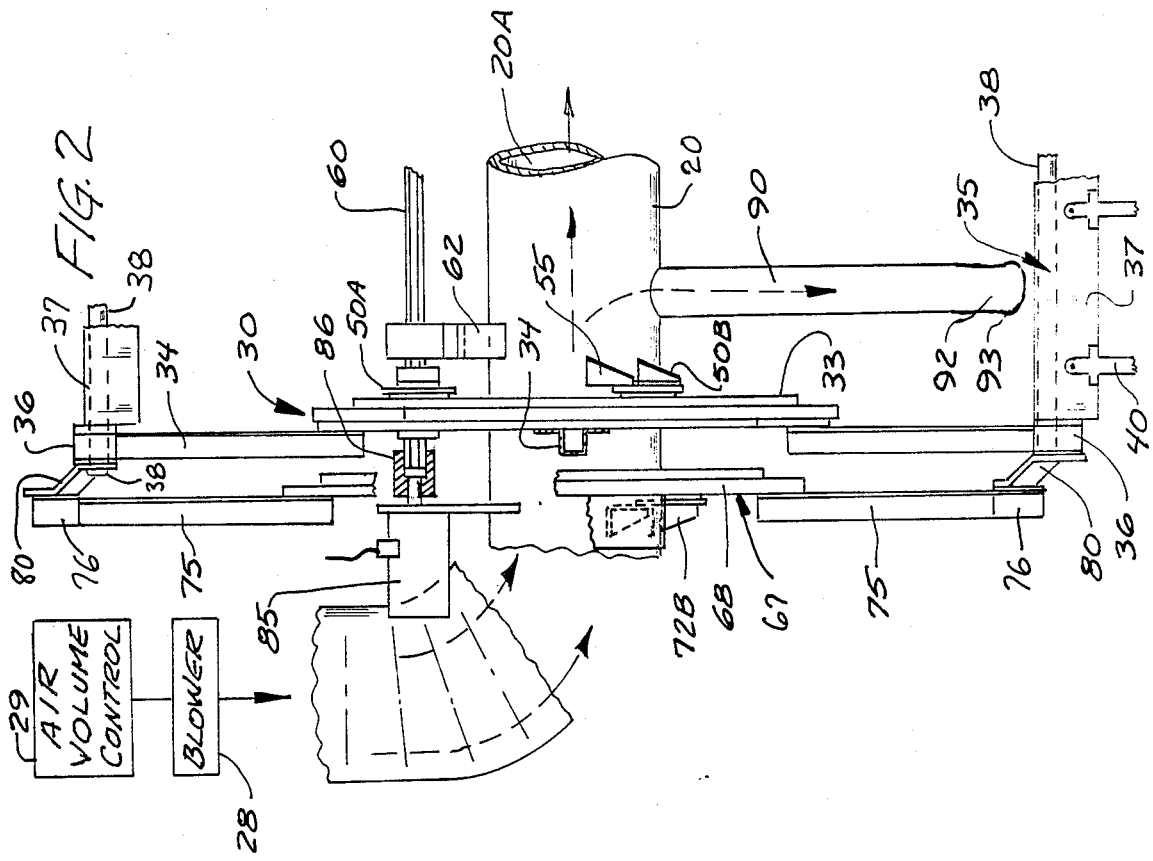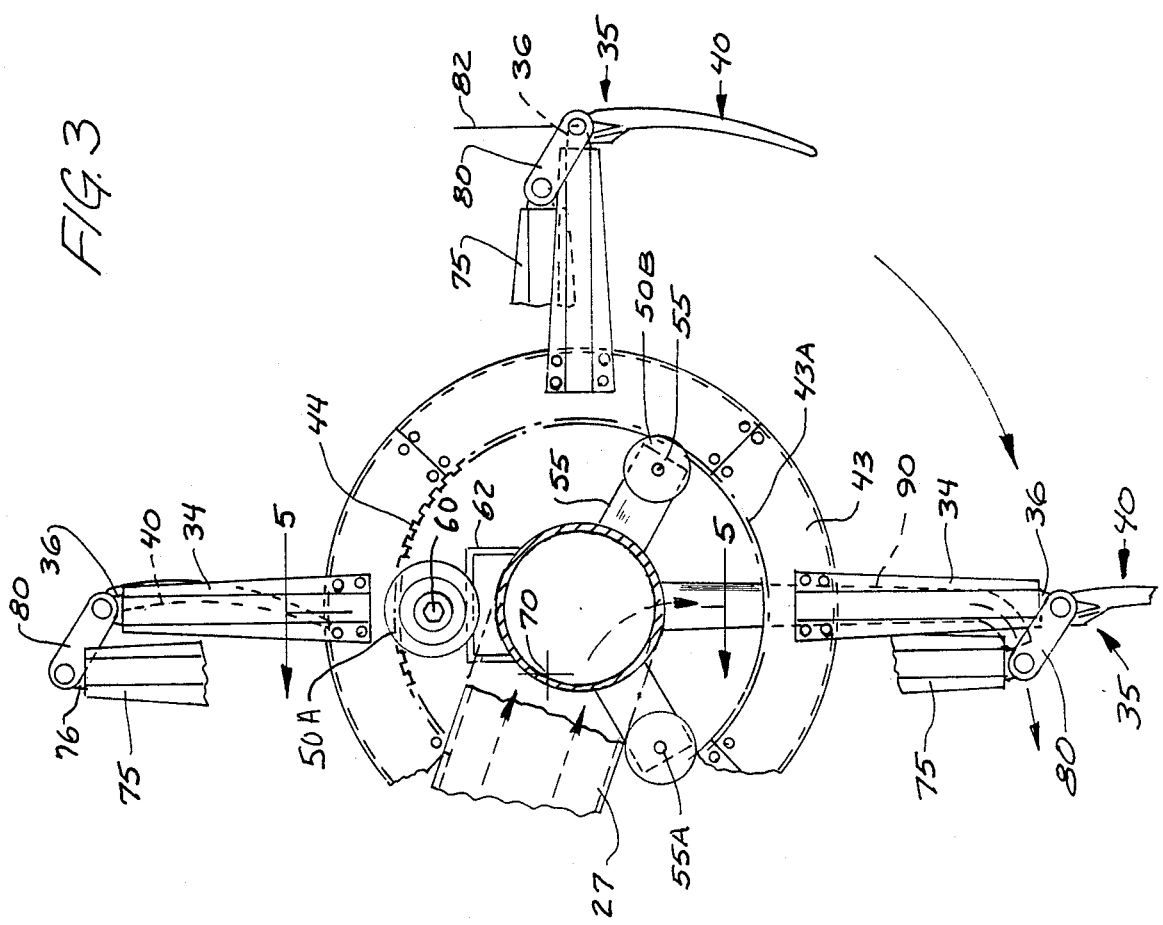

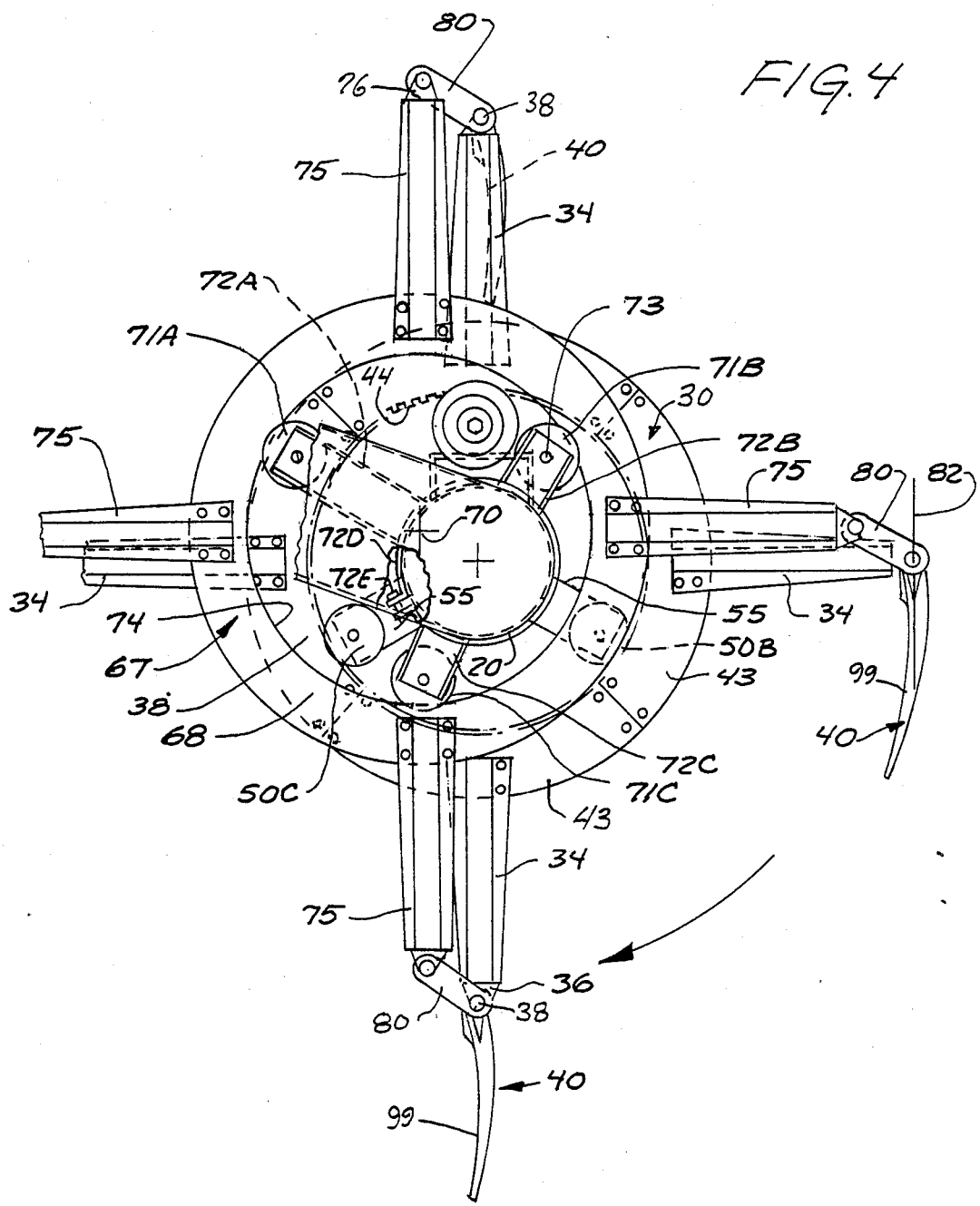

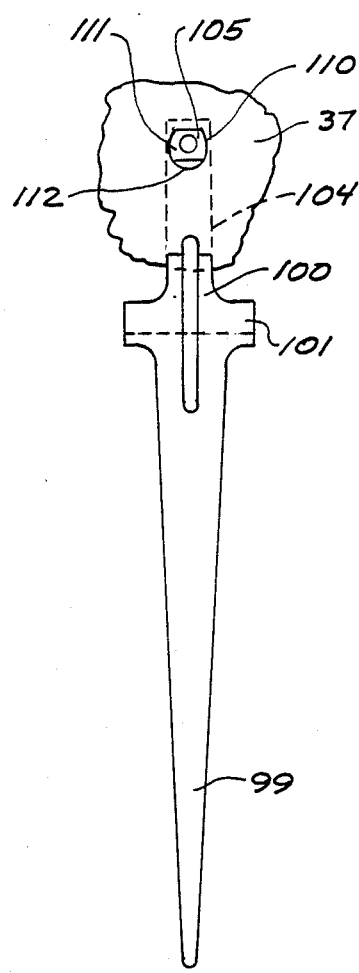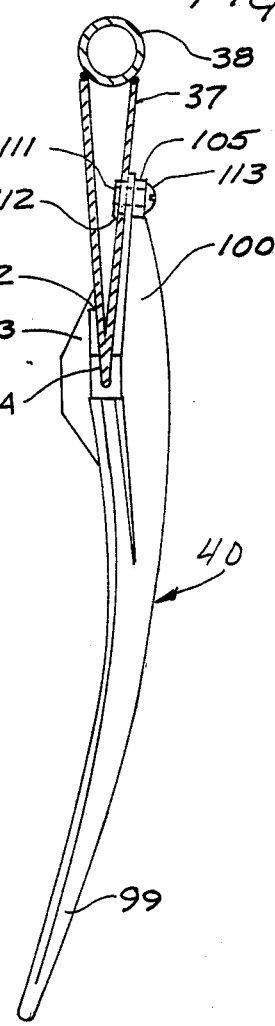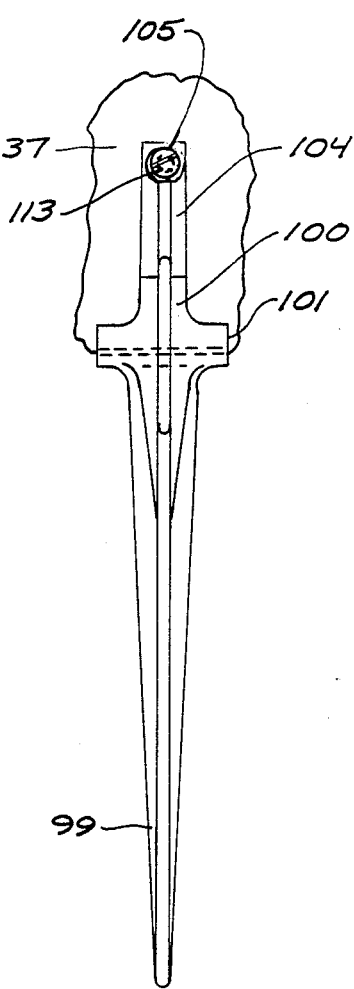

MECHANICAL AIR REEL

BACKGROUND OF THE INVENTION

1. Field of the Invention

The present invention relates to reels used with cutter bars for standing crops such as harvesters, swathers or hay cutting equipment.

2. Description of the Prior Art

In the prior art, harvester "air reels" have been advanced, as shown in U.S. reissue U.S. Pat. Re. No. 32,679. On air reels, an air manifold extends along the cutting platform of a harvester or grain header, and is spaced upwardly from the cutter bar. The manifold has a plurality of drop tubes that extend toward the cutter bar. The tubes have rearwardly directed nozzles that direct a curtain of air against the grain that is being cut by the header to urge the grain into the header. Air reels are particularly effective in short crop, because they will positively direct the grain into the header. In short, grain conventional bat type reels (which have bats or slats which are parallel to the cutter bar) have to be positioned extremely close to the cutter bar.

Air pickup systems have also been used for various harvester or fruit pickers, as shown in U.S. Pat. No. 3,964,245. In this device, which is a picker for strawberries, air is used along with an overlying conveyer belt having tines that extend downwardly therefrom.

U.S. Pat. No. 2,734,331 shows an air attachment for a grain harvesting machine that has long guard members in front that direct a flow of air rearwardly, and these are used in connection with an air reel that has depending tubes that depend from a central manifold and direct air rearwardly toward the front of the cutter bar.

Also, various types of mechanical reels that have fingers on the bats are known. For example, the patents to H. D. Hume, such as U.S. Pat. Nos. 2,252,180 and 2,644,289, as well as U.S. Pat. No. 1,926,538 show reel bats that have outwardly extending tines or fingers which are operated through a cam drive mechanism so that the fingers will be substantially vertical as the reel bats enter the standing crop to reduce shattering of the crop and aid in urging the crop into the cutter bar.

Additional reel constructions which utilize fingers that are actuated as the reel rotates are shown in U.S. Pat. Nos. 3,698,166; 3,703,060; and 4,067,177. All of these reels have a plurality of spiders that rotate with the reel for supporting the bats at spaced locations, and these spiders generally are stiff spoked units that provide the necessary support. A device which shows a fixed cam for mounting pivoting bats is shown in Heth et al. U.S. Pat. No. 2,497,729. None of the mechanical reels show air assistance, and all are generally of the same type, but use different drives for orienting the bats vertically during operation of the reel.

The use of air reels in heavier crops has been limited, because the reels require the drop tubes to be fairly close to the cutter bar, and where a substantial amount of straw is present, the drop tubes can cause plugging, or they will push some of the standing grain down. Shattering losses thus will occur due to the fixed pipes. Likewise, the finger reels have limitations in very tall crops because they too will tend to shatter crop excessively, and also require positioning fairly close to the cutter bar so that feed into the header is maintained and thus visibility of the cutter bar is reduced during use.

SUMMARY OF THE INVENTION

The present invention relates to a combined air and mechanical reel for use with harvesters, swathers and hay mower and conditioner systems. Use on a harvester is illustrated. An air manifold tube is spaced above and extends parallel to the length of a cutter bar on the header. A plurality of individual air flow carrying drop tubes extend downwardly from the manifold. The drop tubes have nozzles that direct air rearwardly to urge standing grain and material on the cutter bar into the auger or header as the harvester moves forwardly. A mechanical finger reel that has a plurality of bats spaced radially out from the axis of rotation is mounted for driving and rotation about the manifold tube. The mechanical reel has bats that are spaced radially outwardly far enough so that they clear the fixed drop tubes. The bats individually pivot on their supports and they are actuated through a cam drive arrangement. The bats are provided with fingers that will remain substantially vertical as the bats enter and exit the grain. The fingers have the advantage of reducing crop shattering as they enter and exit the grain.

The plurality of air flow carrying drop tubes simultaneously provide a curtain of rearwardly directed air that will urge the crop toward the cutter bar. In tall crops in particular, the bat reel adds an additional impetus to move the crop toward the cutter bar. The air from the drop tubes cleans any shattered grain off the cutter bar and urges it back into the header platform where it can be conveyed to the desired location. The mechanical reel does not have to be positioned as close to the cutter bar as normal when no air assist is used.

Thus, the overall action provides for increased yields due to reduced shattering of crops and better visibility so that the operator can determine if there are any obstructions or problems. The drop tubes keep the cutter bar clean because of the advantages of a curtain of air that urges the crop into the platform.

The fingers that are used on the bats of the rotating reel are mounted with a unique snap-in action, and are made of a suitable plastic such as Delrin. These snap-in fingers provide for easier replacement, and are usable in a wide variety of different types of finger reels.

Thus, the advantages of the two types of reels, when combined, greatly enhance the ability to efficiently collect the crop that is being harvested.

The air manifold tube can be adjusted as to its rotational position on the reel support arms by controlling an actuator, such as an electric motor driven ball screw actuator that will in turn rotate the air manifold tube. The pitch angle of the drop tubes, and thus the angle of the flow of air from the tubes relative to the cutter bar is changed. Such adjustment will also rotate the mechanical reel assembly and cause changes in the pitch or angle of the fingers on the reel at the location where the fingers enter and exit the grain. This ability for adjustment of the pitch of the fingers is useful for mechanical finger reels even when no air tubes are used.

The reel bats are supported on arms which extend from support rings that are rotatably mounted on rollers for rotation about the manifold tube. The support rings are gear driven so that there is direct, positive timing and direct support back to the central manifold tube. Cam rings that have centers offset from the support rings but positioned adjacent the support rings are linked to the reel bats to control the pitch angle of the bats and attached fingers. The cam rings are held on rollers which are supported on bands which are adjustable relative to the manifold tube so the cam rings can be adjusted relative to each other and the manifold tube.

While four bats are generally considered to be satisfactory, the reel could have from six to two bats. With two bats 180° apart, the reel could be stopped so that the bats were horizontal and cleared the grain. Only the air nozzles would then have to be used. The mechanical reel is driven with a hydraulic motor that can be separately controlled and provides infinitely variable speed.

The nonrotating, center manifold tube that forms the support for the mechanical reel provides other advantages. For example, spray tubes and nozzles could be mounted on the central manifold tube to permit applying an agent or chemical of some type at the time of harvesting, or if one was using the bat type reel for a harvester for hay, spray nozzles could be used to apply a drying agent to the hay at the time that it was cut.

The reel can be used with fixed bats if desired and the bats will work without fingers.

BRIEF DESCRIPTION OF THE DRAWINGS

FIG. 2 is a fragmentary front elevational view of one end of the reel shown in FIG. 1 and for simplicity with the support tube rotated slightly clockwise for illustration;

FIG. 3 is an end elevational view of the device of FIG. 1 with a cam ring broken away to show a drive and support ring;

FIG. 4 is an end elevational view similar to FIG. 3, but an outer cam ring in place;

FIG. 8 is a sectional view showing an individual snap-on tooth assembly used with the present invention;

FIG. 9 is a rear view thereof with parts in section and parts broken away to show the detail;

FIG. 10 is a front view of the finger shown in FIG. 8; and

DETAILED DESCRIPTION OF THE PREFERRED EMBODIMENTS

Figure 1:
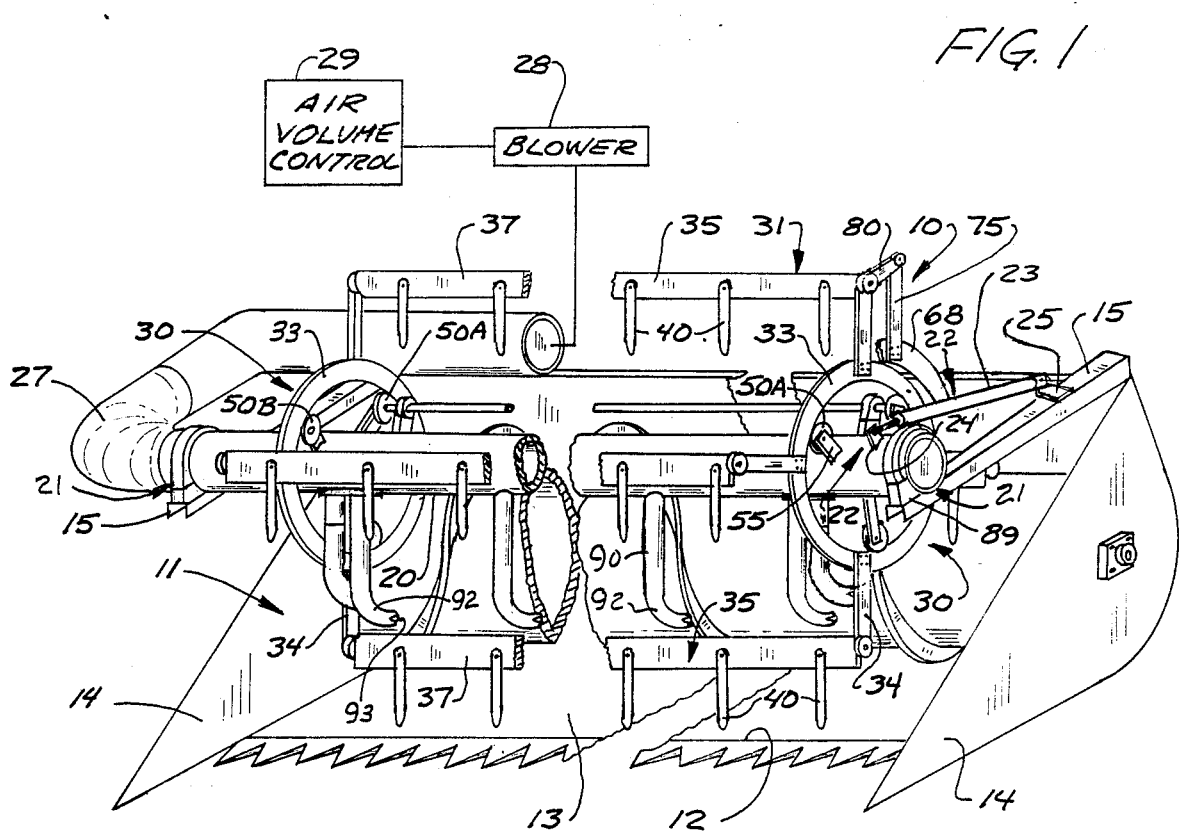
FIG. 1 is a schematic perspective view of a combined mechanical and air reel made according to the present invention.

Referring specifically to FIG. 1, a combined mechanical and air reel is indicated generally at 10, and is used for gathering standing crops. The mechanical and air reel 10 urges crop into a harvester header indicated at 11, which has a cutter bar 12 of conventional design, a platform 13 for receiving the grain, and suitable means (not shown) for conveying the material from the platform 13 directly into a combine, or into a swath. The header 11 has end divider plates 14 at opposite ends thereof, and a pair of reel support arms 15 are schematically shown, and arms 15 conventionally are mounted onto a suitable support for permitting raising and lowering the outer ends of the arms 15 relative to the cutter bar 12.

Figure 6:
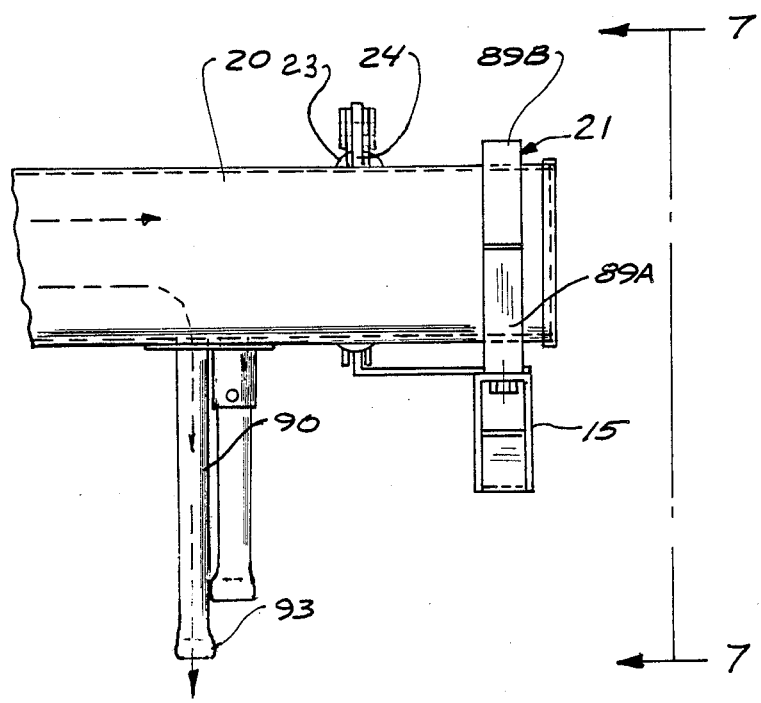
FIG. 6 is a fragmentary front view of a typical support assembly used for supporting a center manifold tube of the present invention.
Figure 7:
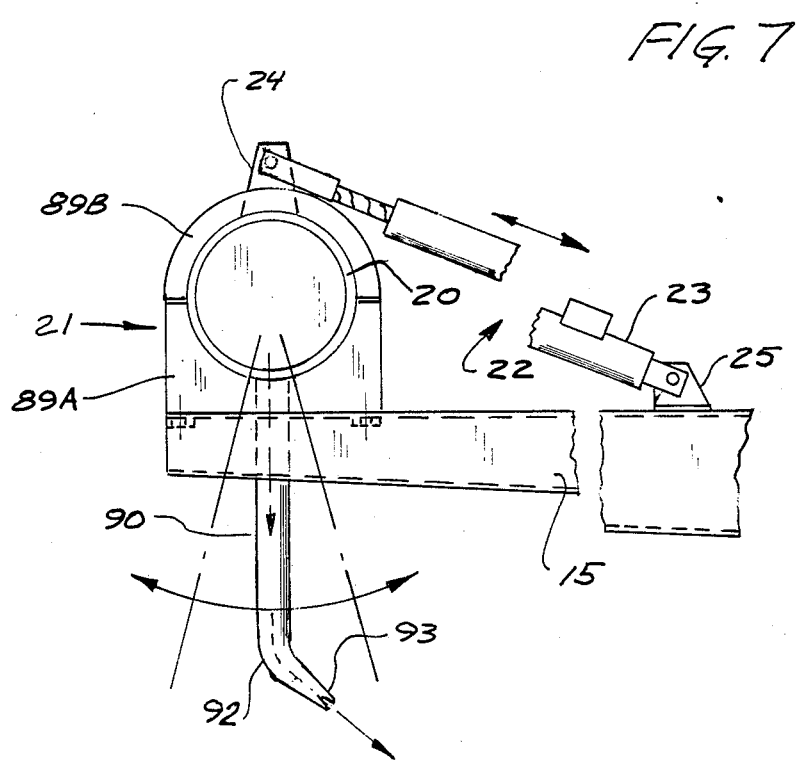
FIG. 7 is an end view of the device of FIG. 6 illustrating the adjustment device used to change the pitch angle of air discharge tubes taken on line 7—7 in FIG. 6.

The mechanical-air reel assembly 10 includes a main center support-manifold tube 20 of large diameter, which has an outer cylindrical surface as shown, but the outer surface could have different configurations. The manifold-support tube is held with suitable support straps or housings 21 on the respective arms 15. Tube 20 is fairly securely held in supports 21 but can be adjusted a limited amount about the longitudinal axis of the tube 20 through a suitable linkage indicated generally at 22 which comprises an actuator 23 operating on a lever arm 24 fixed to tube 20, as best shown in FIGS. 6 and 7. The actuator 23 has its base end connected to a suitable offset support arm 25 that is attached to the reel arm 15.

One end of the tube manifold-support 20, as shown at the left end in FIG. 1, is connected to a suitable flexible conduit 27, which in turn is connected to a blower 28 (FIG. 2) operated through an air volume control 29, such as a damper or the like. The flexible conduit 27 can be supported in a desired location relative to the header 11 with which the mechanical-air reel 10 is utilized. The conduit 27 can be attached to either end of tube 20, and the other end of the tube 20 is blocked with an end cap.

As shown in FIG. 1, the mechanical-air reel includes a rotating bat reel assembly 31 which is supported through a pair of drive and support ring assemblies indicated generally at 30 (FIGS. 2, 3 and 4) at the ends of the tube 20. Each of the ring assemblies 30 includes a drive and support ring 33. Each drive and support ring 33 has a plurality of fixed arm members 34 (four as shown) extending radially therefrom. These arm members 34 are fixed to the drive and support ring 33 with a suitable cap screws or the like, and individual longitudinally extending reel bat assemblies 35 are rotatably mounted on suitable supports 36 (see schematically FIGS. 2, 3 and 4) at the outer ends of arms 34.

Each of the reel bat assemblies 35 is made of a generally shallow V shaped, elongated bat member indicated generally at 37 (see FIG. 8 for example) that has a support tube 38 fixed thereto. The bats 37 and tubes 38 are preferably metal and can be welded together. Each support tube 38 has opposite ends extending outwardly from the associated bat member 37. The end portions of tubes 38 are mounted in pivot supports 36 on the outer ends of arms 34 for pivotal movement. Each reel bat assembly 35 can be pivoted about the axis of support tube 38 on the supports 36 relative to its associated support arms 34. The reel bat assemblies 35 can include a plurality of individual finger members 40, which will be more fully explained, but which are designed to snap into the metal V shaped sections of the reel bat members for ease of replacement and repair.

Each of the arms 34 is fixed to the respective drive and support ring 33, utilizing cap screws which also attach individual gear sections 43 to the drive and support ring 33. Each drive and support ring 33, as can be seen in FIG. 5, has the gear sections 43 attached to a side surface thereof, and each gear section has an internal set of gear teeth indicated at 44 so that when the individual gear sections 43 (one-quarter circle sections are used) are mounted onto the drive and support ring 33, a complete internal toothed gear 43A is formed which extends around the internal periphery of the respective ring 33.

Figure 5:
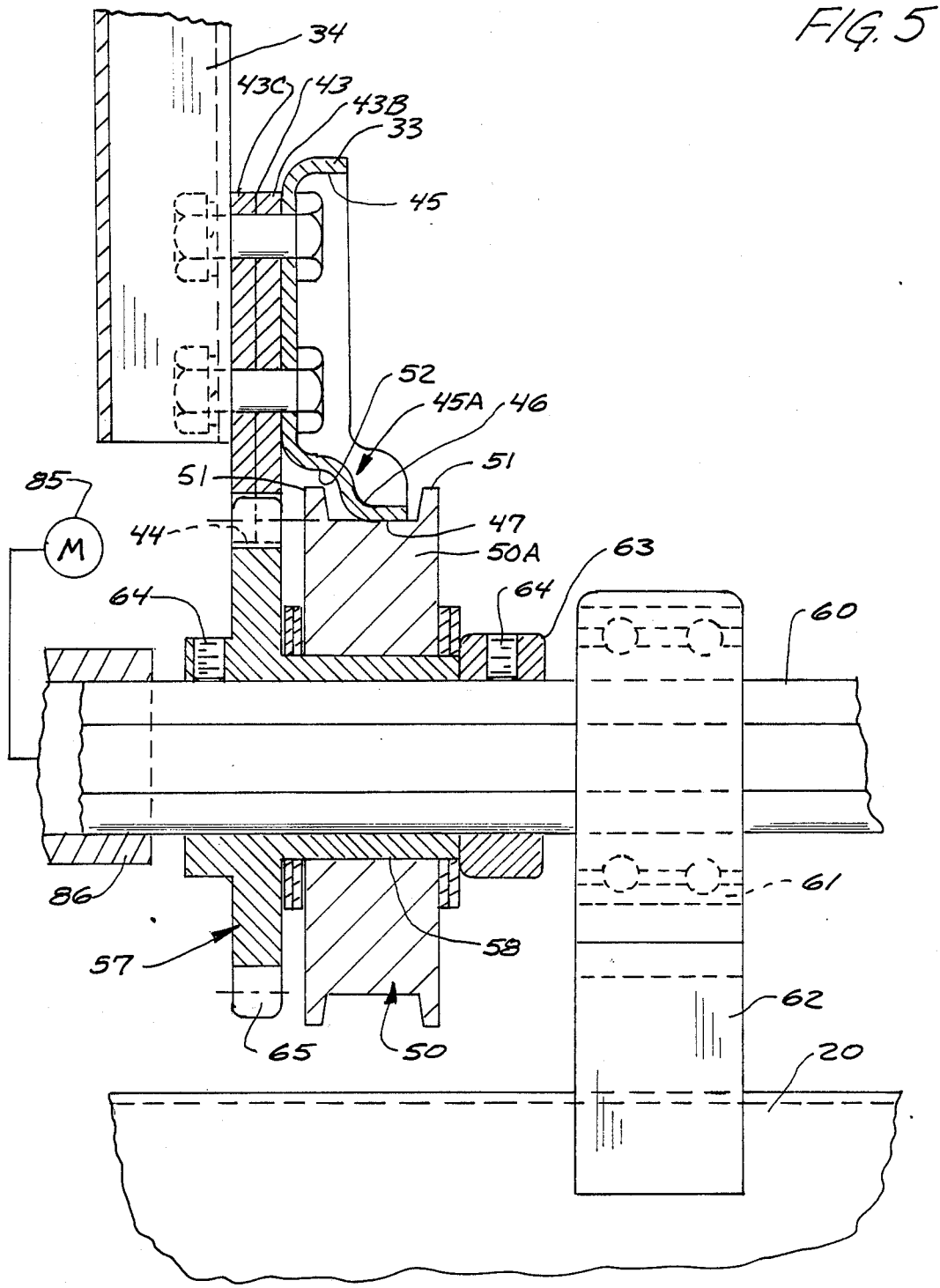
FIG. 5 is a fragmentary sectional view showing details of a drive gear assembly used with the present invention, as well as details of support rollers that are utilized for supporting the support rings for the rotating reel bats.

The drive and support rings 33 are formed with a cross section as shown in FIG. 5, and have an outer flange 45A at the outer periphery thereof. The inner periphery around the center opening in the ring is formed with a track guide flange 46 that has a track surface 47. The track surface 47 is an annular internal surface, and the drive and support rings 33 are supported at the surface for rotation on a plurality of support rollers 50A, 50B and 50C that have outer side flanges 51. The drive and support ring 33 rides between the flanges 51 and does not therefore tend to slide off the roller surfaces. The track guide flange 46 on the ring 33 has an offset shoulder portion indicated generally at 52 which provides for clearance of the aligned flanges 51 of the support rollers 50A–50C.

FIG. 5 illustrates a drive roller 50A and as can be seen in FIG. 3, rollers 50B and 50C are idler rollers supported relative to the center support-manifold tube 20 on radially extending arms 55,55 which are located at substantially equal spacing around the outer periphery of the support-manifold tube 20. The roller 50A, as shown, is associated with a drive pinion gear assembly 57. The drive pinion gear 57 has a hub 58 that extends laterally, and the roller 50A is rotatably mounted on this hub. Hub 58 has a hexagon-shaped bore that fits onto a hexagon cross section drive shaft 60, which is supported in a suitable bearing indicated generally at 61 on a bearing support 62. The center rotational axis of the drive gear 57 and the drive shaft 60 is at the same radial distance from the axis of shaft 60 as the roller axis of rollers 50.

The drive or pinion gear 57 is held in place on shaft 60 with a suitable collar 63, and a set screw 64 is used so that it is properly positioned. The gear 57 has external teeth 65 which engage the internal teeth 44 of the ring gear 43A. The gear set formed by ring gear 43A and drive pinion 57 is provided at both ends of the reel 10 adjacent both of the reel support arms 15, so that both of the drive and support rings 33 are driven for assuring precise location. If intermediate supports for the reel bat assemblies 35 are used, a drive and support ring 33 also could be used, and driven with a gear set from shaft 60.

The angular position of the reel bat assemblies 35 about the axes of tubes 38 is controlled by a cam ring assembly 67, which is shown perhaps best in FIGS. 2 and 4. The cam ring assembly 67 includes a ring 68 that is of generally the same construction as the drive and support ring 33 except that it does not have the gear sections 43 mounted thereon. The cam ring 68 is mounted for rotation about an axis offset from the center of the manifold support tube 20. The axis of ring 68 is shown at 70 in FIG. 4. The cam ring 68 has an internal diameter that has a flange formed to provide a surface which is supported on a plurality of rollers indicated generally at 71A, 71B and 71C. The rollers 71A, 71B and 71C are mounted on radial arms of different lengths that are fixed to an adjustable band 71D that clamps around manifold tube 20 using a clamp bolt 72E. The cam ring 68 rotates around the manifold tube 20. The rollers 71A, 71B and 71C are supported at different distances from the periphery of the center manifold-support tube 20 so that the center or axis 70 will be the proper location for operation. The roller 71A is supported on an arm 72A, which is fixed to clamp band 71D and is substantially longer than the arm 72B supporting roller 71B. An arm 72C supports the roller 71C. Arms 72B and 72C also are fixed to the clamp band 71D. The rollers 71A–71C are mounted on pins 73. The clamp band 71D can be rotated relative to the manifold tube 20 for adjusting the eccentrics and for timing the eccentrics on the manifold tube 20.

The rollers 71A, 71B and 71C have spaced side flanges that guide the inner flange of the cam ring 68, and the rollers 71A–71C have outer surfaces which ride against an inner peripheral cylindrical surface 74 on an inner flange of the cam ring 68. The cam ring 68 has a plurality of bat support arms 75 extending radially therefrom. The number of arms 75 is equal to the number of arms 34 used with the drive and support ring 33. Each of the arms 75 has an outer housing 76 thereon which receives a rotatably mounted pin 77 that is attached to a cam link 80. The cam link 80 at each arm 75 is also drivably connected to the tube 38 of the particular reel bat assembly 35 that is on the associated (adjacent) arm 34 of the drive and support ring 33. The angular orientation of the center plane of the reel bats, indicated generally at 82 in FIGS. 3 and 4, will change relative to arms 34, but will remain substantially oriented vertically in space as the drive and support ring 33 and cam ring 68 both rotate around the support-manifold tube 20.

The drive for the mechanical portion (the reel bats) of the mechanical air reel 10 is through a variable speed hydraulic motor 85 (FIG. 2), that has an output shaft to the drive coupling 86 that drives the hex shaft 60. The shaft 60 in turn will simultaneously drive the pinion gears 57 on both of the drive and support rings (there are only two shown), and drive the internal gear assembly 43A. Since both ends of the mechanical reel 31 are driven (and if desired intermediate drives can be provided), the reel bats 35 will remain in precise orientation. The shaft 60 extends all the way across the mechanical bat type reel and drives both ends of the bat reel and can also center portions of the reel as needed.

The roller 50A has an outer surface which is of the same diameter as the pitch diameter of the drive pinion gear 57. This means that there will be no substantial rotation of the roller 50A relative to the hub 58 under normal conditions, although each roller 50A is free to rotate on the associated hub 58. Plastic weight carrying rollers can be thus used without having them wear excessively. The rollers 50B and 50C will rotate as the drive and support ring 33 is rotated to rotate the mechanical reel assembly 31. At the same time, the cam ring 68 will roll on its support rollers 71A, 71B and 71C and because the center of rotation of cam ring 68 is offset from the axis of the support-manifold tube 20 and drive and support ring 33. The arms 75 follow the arms 34 and the offset axes of rotation causes the cam links 80 to change the orientation of the reel bat assemblies 35 about the pivot axes of tubes 38 of the bats. The teeth or fingers 40 used on the reel bat assemblies 35 will enter the stand of crop and exit the stand of crop at a substantially vertical position, to reduce shattering problems.

The center support-manifold tube 20 receives air from the air blower and has openings leading to individual air distribution or drop tubes 90, which are fixed to the support-manifold tube 20 and which open to the interior chamber 20A of the central support-manifold tube. The air distribution or drop tubes 90, as shown, have rearwardly curved lower end portions 92 which have nozzles 93 provided for directing air back over the cutter bar 12 and onto the header platform 13. These nozzles 93 can be designed to be flattened out and have side slots so that there is a wide fan type rearward flow of air at desired locations. The orientation of the nozzles relative to the cutter bar 12 can be as desired, by adjusting the position of the central support-manifold tube 20 along the longitudinal axis of the arms 15 and by rotating the manifold-support tube 20 about its axis. Vertical adjustment of arms 15 also is possible. The drop tubes 90 are of length to just clear the inner edges of the reel bat assemblies 35.

At the ends of the header, double air tubes can be used for providing additional air at the divider plates 14. The outermost tubes can be adjusted laterally to direct air toward the divider plates 14.

The amount of air that is provided by the blower 28 can be adjusted through a air volume control 29, so that a suitable curtain of air operated in conjunction with the mechanical finger reel bats 35 adequately moves the crop into the cutter bar 12. This air flow is indicated by arrows in FIG. 7, for example.

The adjustment of the central support-manifold tube 20, about its longitudinal axis, and thus the depending distribution tubes 90, is accomplished as shown in FIG. 7 by operating the electric actuator 23 to pivot the manifold-support tube 20 in its supports 21. The supports 21 can be any desired type, and for example can be a saddle 89A on arm 15 that can be adjusted fore and aft on the arm, with a retainer 89B over the top of the tube 20 to permit rotation (a limited amount is all that is necessary) within the supports. The angular position of the support-manifold tube then is controlled by the actuator 23, which can be a ball screw actuator or another suitable electric or hydraulic actuator. An actuator that retains a set position when adjusted is desired because the tube 20 will not be rotated and changed frequently, but primarily will be operated in one desired position for each set of crop conditions. The tube 27 will flex enough to permit this adjustment.

The actuator 23 and mounting of tube 20 also permit the adjustment of the angles of the planes of the reel bat assemblies 35 and fingers 40 as the fingers enter and exit standing crop. The cam for controlling the reel fingers and bats is mounted on rollers 71A–71C supported on the tube 20. Changing the angular position of the tube 20 shifts the relative angular position of the axis 70 of the cam rings 68 relative to the support rings 33. Thus, the angular orientation of the center planes 82 of the reel bats 35 relative to the top of the standing crop at the time of entry of the fingers 40 can be adjusted.

The ring gears 43A are made in quarter sections, and can be relatively low cost. The gears 43A can assembled with two thicknesses of gear sections 43 that form a laminated gear, as illustrated in FIG. 5, with layers 43B and 43C. The layers 43B and 43C simplify the making molding of the gears as well as their assembly. The gear sections 43 are bolted to the respective side surface of the drive and support rings 33. They are held securely to make the full circle internal tooth drive gear 43A.

Figure 11:
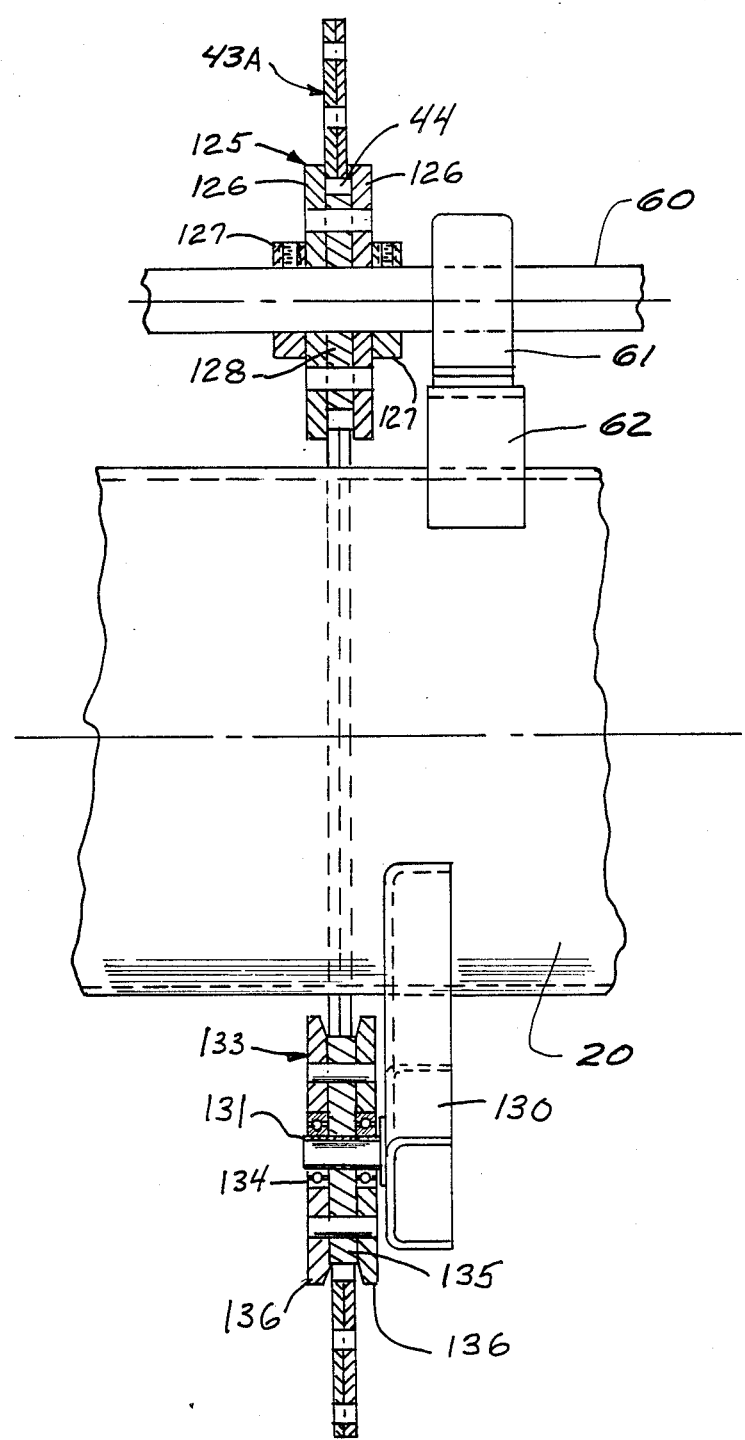
FIG. 11 is a sectional view of a modified support for a drive ring for the reel bats.

The snap-out fingers 40 used on the reel bats 37 are shown in detail in FIGS. 9, 10 and 11. The fingers 40 have an elongated finger section 99, that is supported below a finger support section 100. The sections 99 taper from a wide support member 101 that forms ears down to a relatively narrow point (FIGS. 9 and 10). The support member 101 is made so that it provides a long bearing surface along the end edge 37A of the formed reel bat. The reel bats 37 fit within a molded receptacle 102 that is formed at the rear and in the upper support section 100 of the finger 40. The receptacle 102 is defined by a backing member 103 positioned on the rearward side of the reel bat 37. A mounting tang 104 extends upwardly from receptacle 103 and a molded hub 105 extends laterally inwardly from the tang and snaps into a provided hole or receptacle 110 in the reel bats 37, as can be seen in FIGS. 8 and 9. The receptacle for hubs 105 is formed on the front panel of the reel bat 37. The end 111 of the hub 105 which extends through the hole 110 is flat on the top and has a small rib 112 that fits against the inner surface of bat 37 to detent the hub. The hub 105 has a hole formed through it, and to lock the finger in place a sheet metal screw 113 is threaded into the hole to expand the hub and lock it in place.

After removing screw 113, the upper tang 104 can be pried away from the bat surface, and the end 111 of hub 105 can be released from the hole 110 and the finger 40 replaced or removed as desired. The plastic used for molding the fingers 40 can be selected so that the tang will take bending needed for release and installation without breaking.

The rollers 50A, 50B and 50C are the weight and side thrust carrying rollers for the reel assembly. The internal drive gear 43A and the pinion gear 57 mesh to rotate the reel about the center of the support-manifold tube 20. The rollers 71A, 71B, and 71C react the cam load necessary to effect the change in the pitch angle of the mechanical reel bats and fingers.

In FIG. 11, a modified support arrangement for the drive ring gear is shown. In this form of the invention, separate roller supports that are shown in FIG. 5 are eliminated, and the ring gear 43A is supported directly on rollers, on the inner ends of the gear teeth. The ring gear 43A is shown in cross-section, and in this instance there is no support ring attached to the gear. However, drive shaft 60 is used as before, and is mounted in the same manner on a bearing 61 and a support 62 from the manifold-support tube 20. A pinion drive gear assembly indicated generally at 125 is mounted on the shaft 60, and is driven thereby in the same manner as before, but in this form of the invention the pinion drive gear assembly 125 has a center gear portion 128 which meshes with the teeth 44, and directly supports the ring gear 43A and its connected arms 34 for the reel bats on the pinion drive gear. The pinion drive gear assembly 125 is provided with retaining flange rings 126 on each side of the center gear portion 128, which rings are suitably fastened in place. The pinion drive gear assembly 125 also is held in position on the drive shaft 60 through the use of collars 127.

The ring gear assembly 43A is also supported on two idler rollers, which are the same positions on the tube 20 as the arms 55 and rollers 50B and 50C. However, these rollers directly engage the inner surfaces of the teeth 44 on the ring gear 43. As shown, an arm 130 extends radially from and is fixed to the manifold-support tube 20, and has a pin 131 thereon that rotatably mounts an idler roller 133 on suitable bearings 134 on pin 131. The roller 133 has a center disk 135, which has a smooth outer surface on which the ends of the teeth 44 will ride as the gear 43A is driven, and includes retaining flanges 136 on each side of the center roller disk 135. The flanges 136 prevent the ring gear 43A from sliding off the roller 135 and guide the ring gear 43A in position. The support on the rollers 135 is adequate because the ends of the teeth 44 are relatively flat and adequate support surfaces are provided without undue wear.

Thus, by having two idler rollers such as the one shown at 133 and directly supporting the gear 43A on the drive pinion gear assembly 125, the need for a separate support ring such as the ring having flange 45 is eliminated to reduce cost but yet provide adequate drive force and working life for the unit.

The cam ring for control of the reel bats would still be supported as described before on the rollers 71A, 71B and 71C.

The hex drive shaft 60 used for driving the reel makes the mounting of the drive pinion gear simple. It is a positive drive. Cylindrical shafts with drive rings can also be used. Because there is no rotating central drive shaft or axle on the reel, there is a positive drive at each support for the reel bats. The reel bats can be divided in longitudinal length and one or more center supports made using a drive and support ring and a cam ring if needed. The air drop tubes 90 for carrying air can be of any desired length and configuration. When the air tubes are used in combination with the mechanical reel, a unique arrangement that enhances operation is created.

The reel can be used with two bats, and then by stopping the drive to the mechanical reel portion, the bat can be held in position clearing the standing crop. The air flow then can be used alone to provide the crop gathering function. The mechanical reel rotation speed can be regularly and easily adjusted to suit existing conditions. Likewise, the amount of air that is ejected by the air reel tubes can be changed. The drop tubes are made to minimize frontal area to in turn minimize shattering of grain and also to provide the adequate airflow.

Although the present invention has been described with reference to preferred embodiments, workers skilled in the art will recognize that changes may be made in form and detail without departing from the spirit and scope of the invention.

What is claimed is:

1. A reel apparatus comprising a stationary central member having a longitudinal axis;
   means for rotating a plurality of reel bats around said central member comprising at least two longitudinally spaced supports for supporting a plurality of reel bats;
   positive timing drive means for rotating each of said supports, said drive means comprising a first drive member carried by the respective support for the reel bats, and a second drive member for driving the first drive member to rotate its respective support in a rotatably timed relationship to the other support; and
   means independent of said positive timing drive means for rotatably mounting said supports relative to said central member.

2. The apparatus as specified in claim 1 wherein said means independent for rotatably mounting comprises a first ring rotatably mounted around said central member; a second ring mounted for rotation about said central member about an axis offset from the axis of said first ring, said bats being mounted on arms extending substantially radially from the first ring and said bats being pivotally mounted on said arms about longitudinally extending axes, and means for controlling the pivoting of said bats relative to said first ring comprising a link connected to each bat and connected to said second ring.

3. The apparatus as specified in claim 1 wherein said central member comprises a tubular member carrying fluid under pressure, a plurality of individual depending tubes mounted on said tubular central member and fluidly communicating with the interior of the central member, the depending tubes having downwardly extending portions and rearwardly extending lower portions for carrying fluid under pressure from said central member to the lower ends of said depending tubes, said lower portions directing air toward a cutter bar with which the reel is used.

4. The apparatus as specified in claim 2 and means for adjusting the angular position of said central member about its longitudinal axis.

5. The apparatus as specified in claim 4 wherein said means independent of the drive means for supporting each of the rings comprises a plurality of rotatably mounted rollers spaced outwardly from said fixed central member, said rollers having flange means thereon for receiving and rotatably mounting the respective ring, said first drive members comprising an internal gear in each ring, and each second drive member comprising a drive pinion gear for the respective internal gear.

6. The apparatus as specified in claim 5 wherein said drive pinion and at least one of said rollers are mounted on a common axis, said roller mounted on said common axis having a diameter that is substantially equal to the pitch diameter of the drive pinion.

7. The apparatus as specified in claim 6 wherein said drive pinion has a hub, and the roller mounted on the common axis is rotatably mounted onto the hub.

8. The apparatus as specified in claim 3, and means for adjustably controlling the position of said central member around the longitudinal axis thereof.

9. The apparatus as specified in claim 8 wherein said means for adjustment comprises an actuator, said actuator having one end mounted onto a fixed reference relative to the central member, and the other end coupled to the central member to control rotation thereof about its longitudinal axis.

10. A reel assembly for a crop cutting machine having a cutter bar comprising:
    a stationary elongated tubular support-manifold member having a longitudinal axis;
    means for mounting said support-manifold member on a crop cutting machine;
    said support-manifold member having a plurality of depending tubes extending downwardly there from, said depending tubes opening to the interior of said support-manifold member;
    a source of air under pressure connected to the interior of said support-manifold member to provide a flow of air through the support-manifold member and through said depending tubes, said depending tubes having nozzle means directed rearwardly to direct a flow of air across a cutter bar adjacent on which the reel assembly is mounted;
    a mechanical reel assembly mounted on said support-manifold member for rotation about a central axis, said mechanical reel comprising a plurality of reel bats spaced outwardly from the support-manifold member sufficiently to clear the depending tubes, and being rotatably mounted for rotation about said support-manifold member; and
    means to rotatably drive said reel bats around the axis of said support-manifold member simultaneously with directing air through said depending tubes toward a cutter bar.

11. The reel assembly as specified in claim 10 wherein said reel assembly comprises at least a pair of axially spaced first support ring means, a plurality of arms on each of the first support ring means, said reel bats being pivotally mounted with respect to said arms, said first support ring means being rotatably mounted for rotation around said support-manifold member.

12. The reel assembly as specified in claim 11 and at least one second ring mounted on said support-manifold member, said second support ring being rotatably mounted about an axis that is offset from the axis of the central manifold-support member and offset from the axis of the first support ring means, said second ring having a plurality of arms corresponding in number to the arms on the first support ring means supporting the reel bats, and a separate link coupled to each of the arms supported on the second ring and also respectively coupled to one respective reel bat to control the pivotal position of the reel bats relative to the arms on the first support ring means.

13. The reel assembly as specified in claim 10 wherein the two support ring means are on opposite ends of the support-manifold member, and wherein there are two second rings one on each of the opposite ends of said support-manifold member, each second ring and first support ring means being independently rotatably mounted relative to the support-manifold member, said first support ring means each having internal toothed gear means attached thereto, said internal toothed gear means being spaced outwardly from the periphery of the support-manifold member, a separate drive pinion rotatably mounted with respect to the support-manifold member and positioned to engage the respective internal gear teeth of one of the gear means on an associated support ring means, and a common shaft extending to and driving the separate drive pinions, said common shaft extending along the length of the support-manifold means to drive the drive pinions for the reel assembly simultaneously, and independently controllable motor means for rotating said common shaft.

14. The reel assembly as specified in claim 13 when said first support ring means each have an internal periphery comprising a flange member defining an internal track, and the means for rotatably mounting said first support ring means comprise a plurality of rollers supported for rotation about independent axes on the support-manifold member, said rollers engaging the flange member on the interior of the first support ring means, and each of the rollers being rotated about an axis substantially the same radial distance from the longitudinal axis of the support-manifold member as the other rollers for the first support ring means.

15. The reel assembly of claim 12 and means for supporting the second ring on the support-manifold member comprising a releasable clamp band which fits over support-manifold member, and a plurality of second arms mounted on the clamp band, roller means at the outer ends of the second arms, said second ring having an inner peripheral surface that engages the roller means and is supported thereon, at least one of the second arms on the clamp band being of different length from the other second arms to offset the axis of rotation of the second ring from the axis of the manifold-support member.

16. The reel assembly of claim 10 wherein said means to rotatably drive said reel bats comprises a plurality of support rings rotatably mounted around said support-manifold member, said support rings comprising a ring gear having internal teeth having interior surface defining an internal periphery, a drive gear on the interior of said ring gear and engaging said teeth for supporting said ring gear, said ring gear being supported in a plurality of additional places directly on the inner surfaces of the internal teeth defining the inner periphery.

17. The reel assembly of claim 10 wherein each of said reel bats has a plurality of fingers extending in direction outwardly from the support-manifold member, said teeth being spaced at intervals along the longitudinal length of said reel bats, said reel bats each having a wall, and said fingers comprising a molded support member and an elongated portion, said support member having a surface that engages the bat, and a hub that extends through a provided opening in said wall, said hub having a bore therethrough, and an expanding screw member mounted in said bore to force the outer surfaces of said hub against the edges defining said opening in the thin wall of the respective reel bat to secure the finger in place and permit removing the finger for replacement.

18. In a reel assembly having a plurality of reel bats extending in a longitudinal direction substantially parallel to the axis of rotation of the reel, the improvement comprising a reel bat being provided with a wall having a plurality of apertures therethrough spaced apart in longitudinal direction, and a plurality of finger members mounted on said reel bat, each aperture having a finger member associated therewith, and each of said finger members comprising a molded assembly having a support portion and an elongated finger portion, said elongated finger portion extending outwardly beyond the reel bats when in position thereon and said support portion having a surface that engages the reel bat, a hub molded onto the support portion to extend through an associated opening in said wall, said hub having a through aperture, and said aperture having a threaded screw member therein that expands the outer surfaces of the hub to engage surfaces defining the associated opening in the reel bat.

19. The reel assembly of claim 18 wherein said reel bat has a pair of adjacent walls forming a V-shape from an outer edge thereof toward a main support member, and said support portion of each finger member having a receptacle adapted to receive the outer edge of a reel bat, said first-mentioned surface engaging one said walls, and a second surface of the receptacle engaging the other of the walls, and an end surface defined in said receptacle that engages the outer edge of the reel bat and provides lateral stability when the finger is positioned on such reel bat.

* * * * *

UNITED STATES PATENT AND TRADEMARK OFFICE
CERTIFICATE OF CORRECTION

PATENT NO. : 4,936,082
DATED : June 26, 1990
INVENTOR(S) : David S. Majkrzak

It is certified that error appears in the above-identified patent and that said Letters Patent is hereby corrected as shown below:

Col. 11, line 11, delete "claim 10", insert --claim 11--.

Col. 12, line 25, delete "thin".

Col. 12, line 52, after "engaging one", insert --of--.

Signed and Sealed this

First Day of October, 1991

Attest:

*Attesting Officer*

HARRY F. MANBECK, JR.

*Commissioner of Patents and Trademarks*